US008578582B2

(12) United States Patent
Kurayoshi et al.

(10) Patent No.: US 8,578,582 B2
(45) Date of Patent: Nov. 12, 2013

(54) METHOD OF DEMOLISHING FURNACE OF MULTILAYERED-REFRACTORY STRUCTURE

(75) Inventors: Kazumi Kurayoshi, Kitakyusyu (JP); Ryo Kato, Kitakyusyu (JP); Katsumi Mori, Kitakyusyu (JP); Yoshihito Doi, Kitakyusyu (JP)

(73) Assignee: Nippon Steel Engineering Co., Ltd., Tokyo (JP)

( * ) Notice: Subject to any disclaimer, the term of this patent is extended or adjusted under 35 U.S.C. 154(b) by 0 days.

(21) Appl. No.: 13/391,113

(22) PCT Filed: Jun. 25, 2010

(86) PCT No.: PCT/JP2010/060802
§ 371 (c)(1),
(2), (4) Date: Feb. 17, 2012

(87) PCT Pub. No.: WO2011/027610
PCT Pub. Date: Mar. 10, 2011

(65) Prior Publication Data
US 2012/0144644 A1    Jun. 14, 2012

(30) Foreign Application Priority Data

Sep. 2, 2009  (JP) ................................. 2009-202502

(51) Int. Cl.
*B23P 19/00*    (2006.01)
(52) U.S. Cl.
USPC ..... 29/426.1; 29/426.3; 29/426.5; 29/402.03; 29/402.06; 29/402.08; 29/890.03; 29/890.031; 110/336; 110/341
(58) Field of Classification Search
USPC ............... 29/426.1, 890.031, 402.08, 402.11, 29/402.06, 402.03, 426.3, 426.5, 890.03; 110/336, 341
See application file for complete search history.

(56) References Cited

U.S. PATENT DOCUMENTS 3,528,647 A * 9/1970 Hyde ............................ 432/251
4,003,695 A   1/1977 Kandakov et al.
(Continued)

FOREIGN PATENT DOCUMENTS

JP    A-02-214584    8/1990
JP    A-H07-120165   5/1995
(Continued)

OTHER PUBLICATIONS

Abe et al., Removal Method and Device for Chimney Inner Wall Surface Layer, English Machine Translation, Aug. 24, 2006, pp. 1-9.*

(Continued)

*Primary Examiner* — Jermie Cozart
*Assistant Examiner* — Bayan Salone
(74) *Attorney, Agent, or Firm* — Oliff & Berridge, PLC

(57) ABSTRACT

A method for dismantling a furnace having a multilayered refractory structure including: a furnace shell; a containing layer that is formed of a containing refractory that contains asbestos, and covers the inner side of the furnace shell; and a multilayered non-containing layer that is formed of a non-containing refractory that contains no asbestos, and covers the inner side of the containing layer, the method includes: a primary dismantling process; and a secondary dismantling process conducted after the primary dismantling process. In the primary dismantling process, the non-containing layer is dismantled from a furnace-core side thereof but the containing layer and at least one layer of the layers forming the non-containing layer, which is in contact with the containing layer, are left as a remnant. In the secondary dismantling process, the remnant is dismantled while asbestos measures are implemented.

4 Claims, 16 Drawing Sheets

(56) References Cited

U.S. PATENT DOCUMENTS

| | | | |
|---|---|---|---|
| 4,344,652 A * | 8/1982 | Archenholtz et al. | 299/70 |
| 4,763,584 A * | 8/1988 | Zieren | 110/323 |
| 5,280,495 A * | 1/1994 | Havas et al. | 373/155 |
| 5,513,582 A * | 5/1996 | Antonini et al. | 110/238 |
| 5,926,933 A * | 7/1999 | Kaehr | 29/402.08 |
| 6,260,270 B1 * | 7/2001 | Kimura et al. | 29/890.031 |
| 6,513,789 B2 * | 2/2003 | Kimura et al. | 254/89 H |
| 6,539,602 B1 * | 4/2003 | Ozawa et al. | 29/402.11 |
| 7,753,023 B2 * | 7/2010 | Takami et al. | 123/193.2 |
| 7,827,689 B2 * | 11/2010 | Crane et al. | 29/890.031 |
| 7,921,533 B2 * | 4/2011 | Groen et al. | 29/402.09 |

FOREIGN PATENT DOCUMENTS

| | | | |
|---|---|---|---|
| JP | H07-120165 A * | 5/1995 | |
| JP | A-08-260011 | 10/1996 | |
| JP | H07-067628 A * | 10/1996 | |
| JP | B2-3017655 | 12/1999 | |
| JP | 2003034812 A * | 2/2003 | |
| JP | A-2003-034812 | 2/2003 | |
| JP | A-2004-068136 | 3/2004 | |
| JP | 2002-309919 * | 5/2004 | |
| JP | A-2004-144392 | 5/2004 | |
| JP | A-2004-177081 | 6/2004 | |
| JP | A-2004-315921 | 11/2004 | |
| JP | U-3118801 | 1/2006 | |
| JP | 2006220404 A * | 8/2006 | |
| JP | A-2006-220404 | 8/2006 | |
| JP | A-2006-241500 | 9/2006 | |
| JP | A-2007-247367 | 9/2007 | |
| SU | 823801 A1 | 4/1981 | |
| UA | 17388 A | 4/1997 | |
| UA | 40995 A | 8/2001 | |
| UA | 79 785 C2 | 7/2007 | |

OTHER PUBLICATIONS

Nakai Norikazu; Method of Dismantling Ceramics Oven Refractory; May 12, 1995; English Machine Translaition; pp. 1-3, Figs. 1-3.*

Kawazoe Eiicji; Chimney Deconstructing Method; May 20, 2004; English Machine Translation; pp. 1-20.*

Fumio et al.; Method for Demolishing Hot Stove; Oct. 8, 1996; English Machine Translation; pp. 1-15.*

Abe et al.; Removal Method and Device for Chimney Inner Wall Surface Layer; Jan. 2013; USPTO English Translation; Schreiber Translations; pp. 1-27.*

Sep. 21, 2010 International Search Report issued in International Patent Application No. PCT/JP2010/060802 (with translation).

Sep. 21, 2010 Written Opinion issued in International Patent Application No. PCT/JP2010/060802 (with partial translation).

May 6, 2013 Extended Search Report issued in European Patent Application No. 10813561.7.

Decision of Grant dated Jul. 17, 2013 issued in Russian Patent Application No. 2012112592 (with English-language translation).

* cited by examiner ent invention relates to a method of dismantling a
METHOD OF DEMOLISHING FURNACE OF MULTILAYERED-REFRACTORY STRUCTURE

TECHNICAL FIELD

The present invention relates to a method of dismantling a furnace having a multilayered refractory structure. The present invention is usable for dismantling of a furnace having a multilayered refractory structure in which a furnace inner wall is partly formed of an asbestos-containing refractory.

BACKGROUND ART

Typically, there has been used a furnace having a multilayered refractory structure, in which a refractory such as firebricks is laid in layers on the inner side of an iron outer shell (furnace shell) so that the furnace exhibits resistance to an intense heat therein.

Such a furnace having a multilayered refractory structure has been used as a blast furnace, a non-ferrous furnace, a glass furnace, a hot-blast furnace for supplying hot blast to these furnaces, an annealing furnace of continuous processing equipment for a thin plate, or a heating furnace for heating various steel materials.

As an example of a furnace having a multilayered refractory structure, description will be made on a hot-blast furnace for supplying hot blast to a blast furnace.

A hot-blast furnace includes an internal-combustion hot-blast furnace and an external-combustion hot-blast furnace. An internal-combustion hot-blast furnace has a combustion portion and a heat-storage portion integrally housed therein (e.g., Patent Literature 1). An external-combustion hot-blast furnace has separate furnace bodies respectively functioning as a combustion portion and a heat-storage portion, which are connected to each other at their upper ends via a connection pipe (e.g., Patent Literature 2 and Patent Literature 3).

In either type, combustion gas having a high temperature is generated in the combustion portion with the assistance of a burner, and is passed through the heat-storage portion to store heat. When a sufficient amount of heat is stored, air is reversely passed through the heat-storage portion, thereby generating hot blast (e.g., Patent Literature 4).

The furnace wall of the hot-blast furnace is formed by laying a refractory such as firebricks on the inner side of an iron outer shell (furnace shell) so that the furnace wall exhibits resistance to an intense heat therein. The firebricks of the furnace wall are laid in layers toward a furnace core, so that the thickness of the furnace wall is increased to ensure a heat resistance for a specific part. Other refractories used for the furnace wall are heat-insulating bricks or boards laid between the firebricks and the furnace shell and a heat-insulating coating material sprayed onto the inner surface of the furnace wall.

In an internal-combustion hot-blast furnace, the combustion portion and the heat-storage portion are surrounded by the furnace wall formed as described above. A partition formed of a refractory is provided between the combustion portion and the heat-storage portion.

In an external-combustion hot-blast furnace, each of the furnace bodies respectively functioning as the combustion portion and the heat-storage portion is provided with the above furnace wall having refractories.

Heat-storage bricks as a heat-storage refractory are filled in the heat-storage portion of the internal-combustion hot-blast furnace or in the furnace body as the heat-storage portion of the external-combustion hot-blast furnace. Such heat-storage bricks, being characterized by having pores and a large heat capacity, are a refractory basically similar to firebricks, and are exemplified by hexagonal-columnar gitter bricks (e.g., Patent Literature 5).

A hot-blast furnace is intended to have a decades-long durability. However, since the operation of the hot-blast furnace is accompanied by deterioration of the refractories therein, the hot-blast furnace requires dismantling of the worn refractories therein for renewal thereof. Refractories to be dismantled include the refractories used for the furnace wall and the partition (if the furnace is an inner-combustion type) and the refractory used as the heat-storage material. A large-scale operation using heavy equipment is necessary for dismantling these refractories.

CITATION LIST

Patent Literatures

Patent Literature 1: JP-A-2003-34812
Patent Literature 2: JP-A-2004-68136
Patent Literature 3: JP-B-3017655
Patent Literature 4: JP-A-2006-241500
Patent Literature 5: JP-A-2004-315921

SUMMARY OF THE INVENTION

Problems to be Solved by the Invention

As described above, hot-blast furnaces require dismantling every several decades. Some hot-blast furnaces have to be dismantled with a sufficient caution for handling refractories.

In an old hot-blast furnace built several decades ago, asbestos, which is cheap but excellent in heat insulation, is used as, in particular, a refractory provided near the furnace shell. For instance, asbestos is sprayed onto the inner side of the furnace shell to cover it, or is contained in a board-like heat insulator.

Asbestos is a fibrous silicate mineral belonging to a serpentine group among rock-forming minerals, specifically, a fibrous silicate mineral belonging to a chrysotile and amphibole group, more specifically, actinolite, amosite, anthophyllite, crocidolite or tremolite, or, alternatively, is a mixture containing one or a plurality of the above.

Recently, since asbestos has become a problem in terms of a risk to human health, in dismantling a building or the like using asbestos, strict asbestos measures including scattering control have to be implemented under "Ordinance on Prevention of Health Impairment due to Asbestos" or the like. Specifically, the following operations 1) to 4) and the like have to be carried out under strict control: 1) isolating an operation site, making the pressure of the operation site negative and establishing a security zone; 2) dismantling while diffusing humectant; 3) packing asbestos debris in a double-layer bag; and 4) carrying and disposing of the asbestos debris as an industrial waste subject to special control.

In a typical dismantling method, a furnace is mechanically or manually dismantled down from an upper side of the inside thereof by 2 to 3 m. At this time, asbestos-containing refractories and asbestos-free refractories of the furnace wall and inside the furnace are dismantled together and mixed as a waste. Asbestos measures have to be implemented for the total amount of such a waste.

In a typical dismantling of a hot-blast furnace, the amount of a waste generated from one furnace reaches, for instance, 3,000 to 6,000 tons. When asbestos measures need to be implemented for such a large amount of waste, the dismantling of a hot-blast furnace requires an enormous workload and thus becomes a large burden in terms of time and cost.

Although the above description is made on dismantling of a hot-blast furnace for a blast furnace as an example of a furnace having a multilayered refractory structure, dismantling of furnaces having a multilayered refractory structure for other uses, such as a blast furnace for a non-ferrous furnace, a glass furnace, an annealing furnace of continuous processing equipment for a thin plate, and a heating furnace for various steel materials, also have the same problems. In other words, any furnace having a multilayered refractory structure built several decades ago uses asbestos, which is cheap but excellent in heat insulation, as a refractory provided near a furnace shell. Thus, dismantling of the above-exemplified furnaces has the same problems as those described above in relation to a hot-blast furnace.

An object of the invention is to provide a method of dismantling a furnace having a multilayered refractory structure, capable of reducing costs for dismantling the furnace having a multilayered refractory structure (i.e., costs for handling asbestos) and shortening time for dismantling.

Means for Solving the Problems

According to an aspect of the invention, a method for dismantling a furnace having a multilayered refractory structure including: an outer shell; a containing layer that is formed of a containing refractory that contains asbestos and covers an inner side of the outer shell; and a multilayered non-containing layer that is formed of a non-containing refractory that contains no asbestos and covers an inner side of the containing layer, includes: primary dismantling; and secondary dismantling conducted after the primary dismantling, in which in the primary dismantling, the non-containing layer is dismantled from a furnace core side thereof but at least one outermost layer of layers that form the non-containing layer as well as the containing layer are left as a remnant, and in the secondary dismantling, the remnant is dismantled while asbestos measures are implemented.

In the method, a part other than the remnant is dismantled in the primary dismantling. In other words, it is possible to dismantle furnace wall refractories, i.e., the refractories provided on the inner side of the outer shell (usually, furnace shell), except the remnant. Since the remnant containing asbestos is not dismantled in the primary dismantling, the asbestos measures are not required and thus the workload can be significantly reduced as compared with the workload required when the asbestos measures are implemented. Subsequently, the remnant is dismantled in the secondary dismantling. In the secondary dismantling, the refractories of the remnant are treated while implementing the asbestos measures, thereby ensuring safety against asbestos contained in the remnant. In this method, the remnant can be so sufficiently reduced that the workload can be reduced.

For instance, in the case of an asbestos-using hot-blast furnace for a blast furnace, the amount of refractories used inside the furnace reaches 3,000 to 6,000 tons. According to the above aspect of the invention, the amount of the remnant to be dismantled as asbestos can be reduced to 100 to 200 tons.

In the case of a typical hot-blast furnace of either the internal-combustion type or the external combustion type, a space surrounded by the furnace wall refractories is filled with a heat-storage refractory, the amount of which reaches 1,000 to 2,000 tons.

In the primary dismantling, it is preferable that both the heat-storage refractory and the furnace wall refractories (except the remnant) are dismantled. With the above arrangement, the remnant for which the asbestos measures have to be implemented can be minimized. Alternatively, the heat-storage refractory may be dismantled before dismantling the furnace wall refractories, or only the heat-storage refractory may be dismantled in the primary dismantling. In this aspect of the invention, a suitable method may be taken depending on the deterioration of the non-containing refractory layer provided on the furnace-core side of the asbestos-containing refractory layer in a target to be dismantled, for instance, a hot-blast furnace. In the case of an internal-combustion hot-blast furnace, the heat-storage refractory includes the partition in addition to the heat-storage bricks.

In the above aspect of the invention, it is preferable that the remnant is fixed on the outer shell in the primary dismantling.

With the above arrangement, even when the remnant is thinly left in the primary dismantling, the remnant is fixed and prevented from falling off. Thus, the remnant can be minimized, thereby ensuring safety while reducing the workload for the asbestos measures.

In the above aspect of the invention, it is preferable that an inside of the furnace is vertically divided into a plurality of sections, each of which being sequentially subjected to the primary dismantling and the secondary dismantling, and the sections are independently subjected to the primary dismantling and the secondary dismantling at sequentially shifted timings.

With the above arrangement, while the primary dismantling or the secondary dismantling is conducted in one section, installation of a new inner wall can be started in the precedent section. Thus, as compared with the case where the primary dismantling, the secondary dismantling and the installation are conducted for the furnace as a whole, a waiting time before the next process can be reduced, thereby reducing the total operation time.

In the above aspect of the invention, it is preferable that debris generated after dismantling the remnant is further crushed within the furnace in the secondary dismantling.

According to the invention, since the remnant to be dismantled in the secondary dismantling includes not only the containing refractory but also at least the outermost layer of the layers constituting non-containing layer, the substantial diameter of the debris is as large as 100 mm to 400 mm, so that the debris is filled in a bag with less efficiency. In view of the above, the debris is secondarily crushed within the furnace for improving operation efficiency and reducing a disposal volume.

Such secondary crushing and packing conducted inside the furnace may be used in combination with crushing and packing in typical air-tight equipment installed outside the furnace.

DESCRIPTION OF THE EXEMPLARY EMBODIMENTS

Exemplary embodiments of the invention will be described below with reference to the attached drawings.

First Exemplary Embodiment

Figure 1:
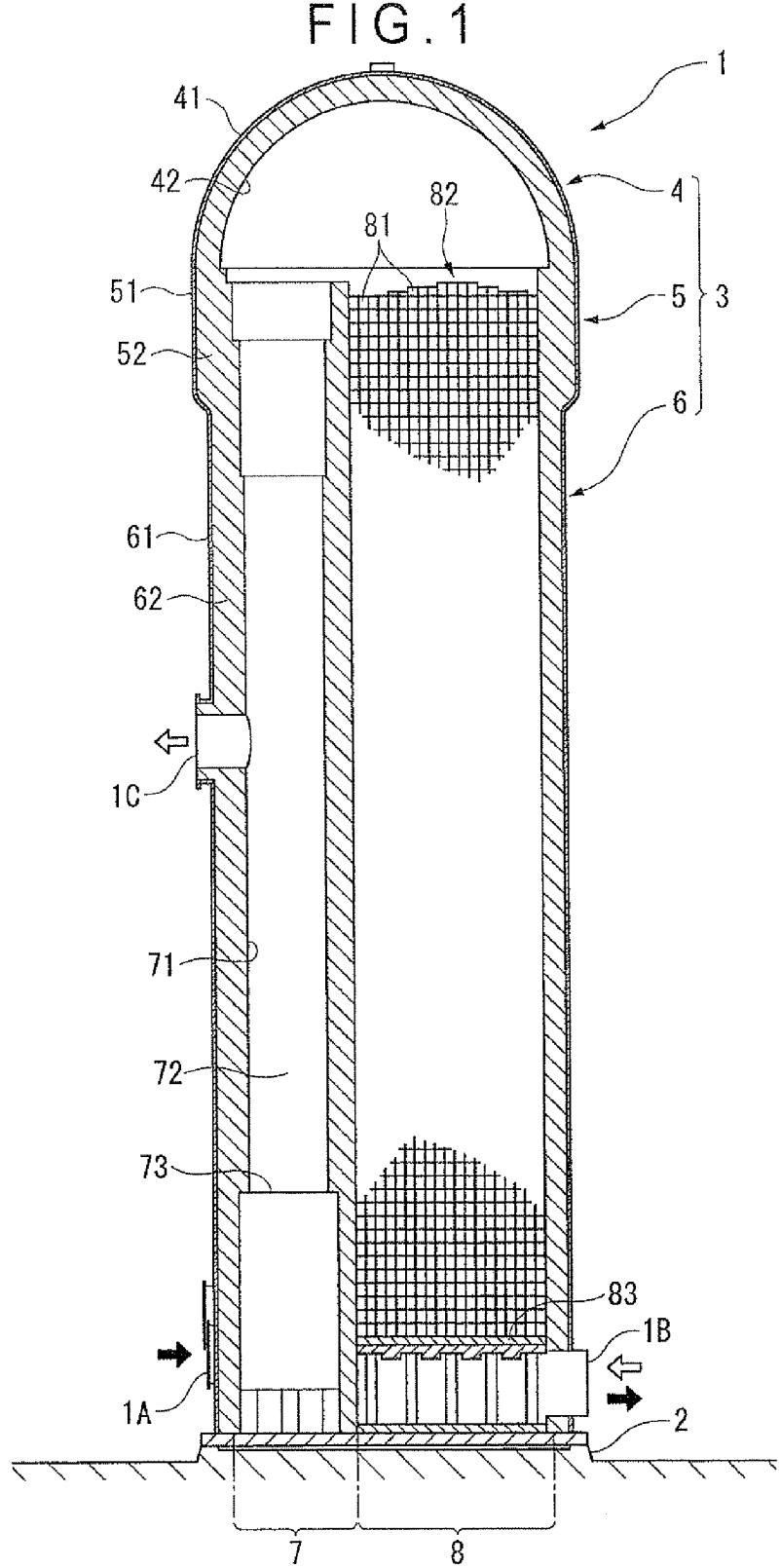
FIG. 1 is a vertical cross-sectional view showing a hot-blast furnace according to a first exemplary embodiment of the invention.
Figure 2:
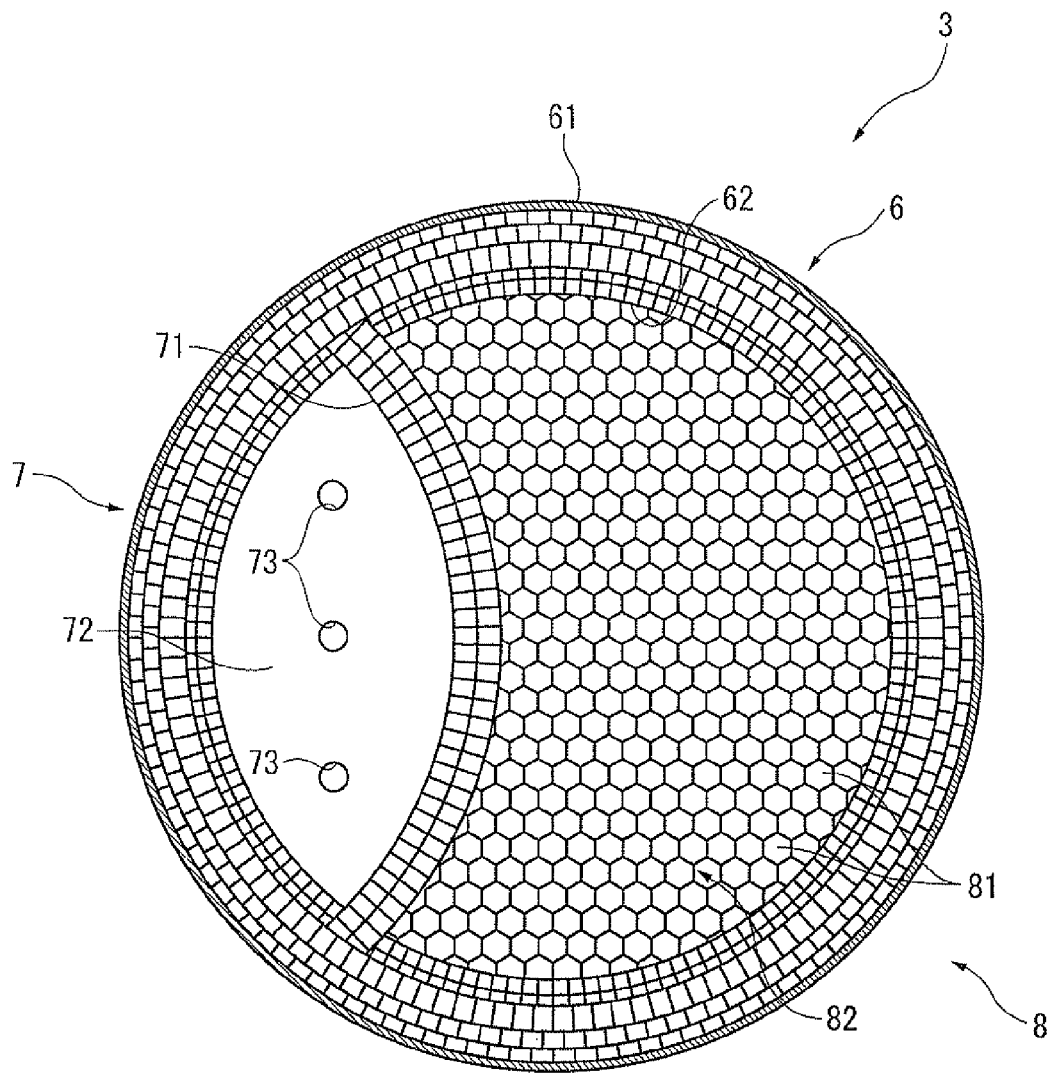
FIG. 2 is a traverse cross-sectional view showing the hot-blast furnace according to the first exemplary embodiment.

FIGS. 1 and 2 show a hot-blast furnace 1, to which the invention is applied, as an example of a furnace having a multilayered refractory structure according to the first exemplary embodiment.

Referring to FIG. 1, the hot-blast furnace 1 includes a furnace body 3 mounted on a base 2. The furnace body 3 includes a cylindrical straight body 6, a conical portion 5 with a relatively large diameter formed on an upper side of the straight body 6, and a semispherical dome 4 formed on the top of the conical portion 5.

FIG. 2 shows a traverse cross-sectional shape of the straight body 6. As shown in the figure, a combustion chamber 7 is formed inside the straight body 6 on the left side in the figure and the rest of the inside of the straight body 6 is defined as a regenerator 8.

The combustion chamber 7 includes a partition 71 that has an arc cross section and is formed of firebricks, and a gas passage 72 that vertically extends therethrough (see FIG. 2).

A burner 73 for sending combustion gas having a high temperature into the gas passage 72 is provided at a lower end of the partition 71 (see FIG. 1).

In the regenerator 8, hexagonal-columnar heat-storage bricks 81 are arranged to form a heat-storage body 82 that entirely fills the regenerator 8 (see FIG. 2). The heat-storage body 82 is supported by a support 83 provided at a bottom of the regenerator 8 (see FIG. 1).

Each of the heat-storage bricks 81 of the heat-storage body 82 has a vertically penetrating pore. The heat-storage bricks 81 are arranged in such a manner that the respective pores thereof are mutually continuous (illustration omitted) to allow ventilation entirely from the top of the heat-storage body 82 to the support 83.

The furnace body 3 is provided with a fuel inlet 1A, an outer-air communication opening 1B and a hot-air outlet 1C.

The fuel inlet 1A is provided in a lower portion of the straight body 6 near the combustion chamber 7 to be in communication with the burner 73.

The outer-air communication opening 1B is provided in a lower portion of the straight body 6 near the regenerator 8 to be in communication with a hollow space below the support 83.

The hot-air outlet 1C is provided in the straight body 6 at the middle level of the regenerator 8 to be in communication with the gas passage 72 of the combustion chamber 7.

In such a hot-blast furnace 1, while the hot-air outlet 1C is closed, a fuel such as a blast furnace top gas is fed into the burner 73 through the fuel inlet 1A to be burn therein. The combustion gas flows upward through the gas passage 72 and is reversed in the dome 4. The reversed combustion gas passes through the heat-storage body 82 and is ejected through the outer-air communication opening 1B. The heat-storage body 82 stores heat from the passing combustion gas having a high temperature.

After a predetermined amount of heat is stored, the burner 73 is stopped, the hot-air outlet 1C is opened to be connected to a blast furnace, and outer air is taken through the outer-air communication opening 1B. The outer air is then heated while passing through the heat-storage body 82. The heated air is reversed in the dome 4 to be taken as hot blast through the hot-air outlet 1C.

In order to exhibit resistance against such combustion gas or the like having a high temperature, the furnace body 3 employs a heatproof structure of refractories.

The dome 4, the conical portion 5 and the straight body 6 of the furnace body 3 respectively include furnace shells 41, 51 and 61 (iron outer shells) as furnace walls, and refractories 42, 52 and 62 provided mainly by firebricks and heat-insulating bricks laid on the inner sides of the furnace shells 41, 51 and 61.

In the conical portion 5 and the straight body 6, the partition 71 of the combustion chamber 7 and the heat-storage body 82 of the regenerator 8 are surrounded by the refractories 52 and 62.

The structures of the refractories 42, 52 and 62 of the dome 4, the conical portion 5 and the straight body 6 are selected in accordance with respective required heat resistances of the dome 4, the conical portion 5 and the straight body 6.

Figure 3:
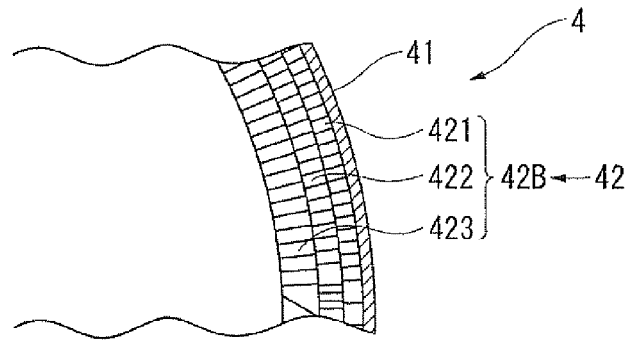
FIG. 3 is an enlarged cross-sectional view showing a wall body of a dome according to the first exemplary embodiment.

As shown in FIG. 3, in the dome 4, a castable 421 is formed on the inner side of the furnace shell 41 by spraying, and heat-insulating bricks 422 and firebricks 423 are laid on the inner side of the of the castable 421.

The castable 421, the heat-insulating bricks 422 and the firebricks 423 of the dome 4 are non-containing refractories that contain no asbestos and thus correspond to a non-containing layer 42B according to the invention.

Since a containing refractory that contains asbestos is not used in the dome 4, the dome 4 does not have a portion corresponding to a containing layer according to the invention that requires asbestos measures. Thus, any portion of the dome 4 is not selected as a remnant according to the invention. Accordingly, in primary dismantling of the dome 4, the firebricks 423 to the castable 421 of the non-containing layer 42B are simultaneously dismantled as described above.

Figure 4:
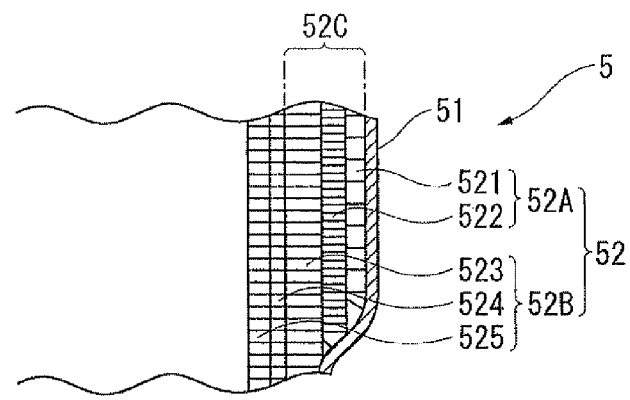
FIG. 4 is an enlarged cross-sectional view showing a wall body of a conical portion according to the first exemplary embodiment.

As shown in FIG. 4, in the conical portion 5, a castable 521 is formed on the inner side of the furnace shell 51 by spraying. On the inner side of the castable 521, a heat-insulating board 522 containing amosite is laid. On the inner side of the insulating board 522, heat-insulating bricks 523 and 524 and firebricks 525 are laid.

In the conical portion 5, the heat-insulating board 522 is a containing refractory that contains asbestos and thus the heat-insulating board 522 and the castable 521 formed on the outer side thereof correspond to a containing layer 52A. Though the castable 521 is a non-containing refractory that contains no asbestos, since the castable 521 cannot be dismantled without dismantling the heat-insulating board 522 formed on the inner side thereof, the heat-insulating board 522 and the castable 521 are treated as the containing layer 52A. Since the heat-insulating bricks 523 and 524 and the firebricks 525 are non-containing refractories that contain no asbestos, the heat-insulating bricks 523 and 524 and the firebricks 525 correspond to a non-containing layer 52B according to the invention.

A remnant 52C according to the invention is the heat-insulating bricks 523 that are arranged at the outermost side of the non-containing layer 52B to form at least one layer contacting with the containing layer 52A, and the castable 521 and the heat-insulating board 522 in the containing layer 52A. In the below described primary dismantling, the refractories are dismantled with the remnant 52C being left.

Figure 5:
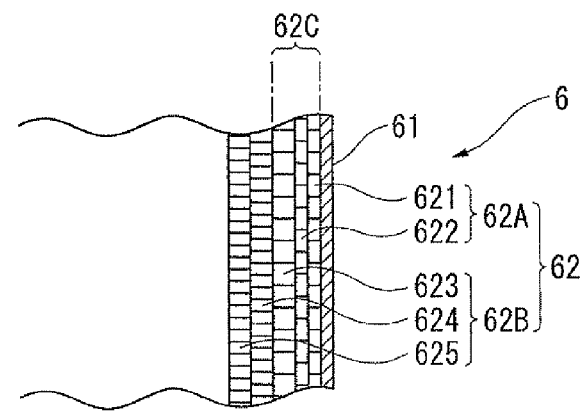
FIG. 5 is an enlarged cross-sectional view showing a wall body of a straight body according to the first exemplary embodiment.

As shown in FIG. 5, in the conical portion 6, a slag wool layer 621 is formed on the inner side of the furnace wall 61 by spraying. On the inner side of the slag wool layer 621, a heat-insulating board 622 containing amosite is laid. On the inner side of the heat-insulating board 622, heat-insulating bricks 623 and 624 and firebricks 625 are laid.

The slag wool layer 621 and the heat-insulating board 622 of the straight body 6 are containing refractories that contain asbestos and thus correspond to a containing layer 62A according to the invention. The heat-insulating bricks 623 and 624 and the firebricks 625 are non-containing refractories that contain no asbestos and thus correspond to a non-containing layer 62B according to the invention.

A remnant 62C according to the invention is the heat-insulating bricks 623 arranged at the outermost side of the non-containing layer 62B to form at least one layer contacting with the containing layer 62A, and the slag wool layer 621 and the heat-insulating board 622 in the containing layer 62A. In the below-described primary dismantling, the refractories are dismantled with the remnant 62C being left.

In order to dismantle the refractories inside the hot-blast furnace 1 or provide a new refractory to the hot-blast furnace 1, the following process is carried out.

Figure 6:
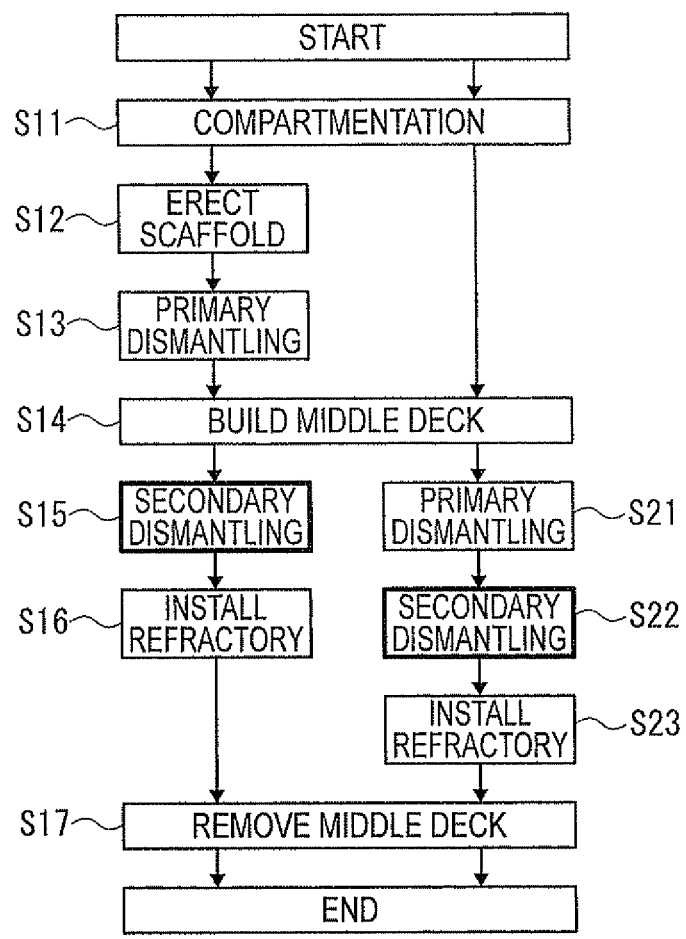
FIG. 6 shows a dismantling process according to the first exemplary embodiment.

Referring to FIG. 6, compartmentation is initially conducted before dismantling is started (step S11).

Figure 7:
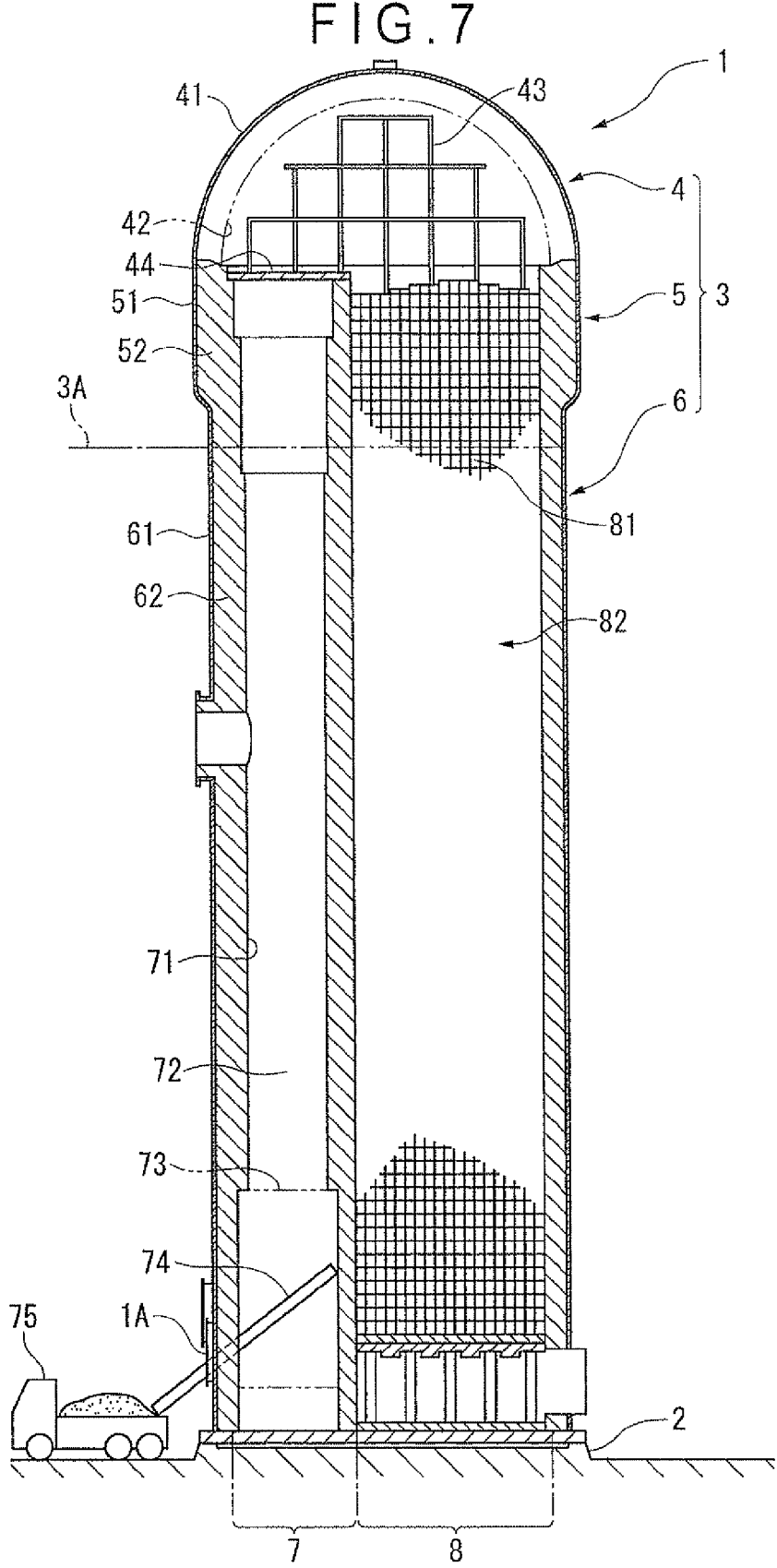
FIG. 7 is a vertical cross-sectional view showing primary dismantling in a first section according to the first exemplary embodiment.

As shown in FIG. 7, according to the exemplary embodiment, a partition line 3A is provided near the upper end of the straight body 6. A portion of the straight body 6 above the partition line 3A, the conical portion 5 and the dome 4 are defined as a first section. A portion of the straight body 6 below the partition line 3A is defined as a second section.

Next, a scaffold is erected for an operation on an inner wall surface of the dome 4 (step S12 in FIG. 6).

As shown in FIG. 7, a scaffold 43 is provided on the heat-storage bricks 81 of the regenerator 8. A cover 44 is used to close an opening of the gas passage 72 in the combustion chamber 7. The cover 44 is beforehand provided with a waste vent into which a waste generated in the below-described primary dismantling is dumped.

Simultaneously, the burner 73 is removed from the lower portion of the combustion chamber 7 and a conveyor 74 is provided instead by inserting the conveyor 74 through the fuel inlet 1A so that refractories dumped from above during the below-described primary dismantling are received by the conveyor 74 and carried out to a dump truck 75.

When the above preparation is completed, primary dismantling in the first section is conducted (step S13 in FIG. 6).

Specifically, the primary dismantling of the furnace wall of the dome 4 is first conducted by using the scaffold 43. After the scaffold 43 is removed, the firebricks of the partition 71 of the combustion chamber 7 extending from the conical portion 5 to the straight body 6 and the heat-storage bricks 81 of the regenerator 8 are sequentially dismantled from the respective tops thereof. Simultaneously, since the respective inner walls of the conical portion 5 and the straight body 6 are exposed inside the furnace as the partition 71 and the heat-storage bricks 81 are dismantled, the primary dismantling of these inner walls is also conducted.

In the primary dismantling of the furnace wall, according to the invention, the non-containing layer is dismantled from the furnace-core side with at least one outermost layer of the non-containing layer and the containing layer being left.

At the dome 4, as shown in FIG. 3, the castable 421, heat-insulating bricks 422 and firebricks 423 of the non-containing layer 42B are dismantled all together. Since no portion of the dome 4 is left as a remnant, subsequent secondary dismantling is omitted therefor.

At the conical portion 5, as shown in FIG. 4, only two layers (i.e., the heat-insulating bricks 524 and the firebricks 525) are dismantled, so that the heat-insulating bricks 523 arranged at the outermost side of the non-containing layer 52B and the castable 521 and heat-insulating board 522 of the containing layer 52A are left as the remnant 52C.

At the straight body 6, as shown in FIG. 5, only the firebricks 625 and the heat-insulating bricks 624 are dismantled, so that the heat-insulating bricks 623 arranged at the outermost side of the non-containing layer 6213 and the slag wool layer 621 and heat-insulating board 622 of the containing layer 62A are left as the remnant 62C.

After the primary dismantling in the individual portions, the furnace wall in the dome 4 has only the furnace shell 41 left, the furnace wall in the conical portion 5 has only the furnace shell 51 and the remnant 52C present on the inner side thereof left, and the furnace wall in the straight body 6 has the furnace shell 61 and the remnant 62C present on the inner side thereof left. Since these remnants 52C and 62C are thinner than the original refractories 52 and 62, the remnants 52C and 62C are easy to, for instance, separate from the furnace shells 51 and 61, respectively.

Accordingly, in order to reinforce the bonding between the remnant 52C and the furnace shell 51 and between the remnant 62C and the furnace shell 61, remnant fixation according to the invention is conducted. The remnant fixation prevents the remnants 52C and 62C from falling off, so that the dismantling can be safely conducted.

The remnant fixation is conducted in parallel with the dismantling of the refractories 52 and 62, excluding the remnants 52C and 62C, between the primary dismantling processes for the individual portions.

Figure 8:
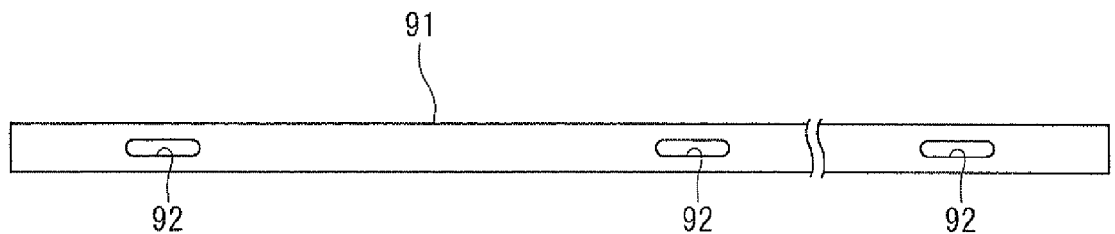
FIG. 8 is a front view showing a fixation plate used for remnant fixation according to the first exemplary embodiment.

Referring to FIG. 8, a fixation plate 91 provided by an elongated iron plate is used for the remnant fixation. Fixation holes 92 are formed in the fixation plate 91 at predetermined intervals. Each of the fixation holes 92 is formed as a slit extending in the longitudinal direction of the fixation plate 91. The slit configuration of the fixation hole 92 tolerates misalignment with a fixation bar 94 and the like.

The fixation plate 91 may be made of a material different from iron, such as any metal other than iron, wood such as plywood, or a synthetic resin material.

When a rigid material such as the iron plate is used as the fixation plate 91, the fixation plate 91 is desirably curved beforehand in accordance with the curvature of the inner surface of the furnace wall to be held.

As the fixation plate 91, a flexible material such as a synthetic resin material or a metallic thin plate material may be used. By using such a flexible material, the fixation plate 91 can be easily curved on site in accordance with the curvature of the inner surface of the furnace wall to be held.

As the fixation plate 91, a sheet-like or wide plate material may be used in place of the elongated plate material. By using such a material, the fixation plate 91 can hold the remnant over a wide area, so that the fixation plate 9 is effective for the remnant in, for instance, the dome 4 because the remnant in the dome 4 is likely to separate downward.

A specific process of the remnant fixation is as follows.

Figure 9:
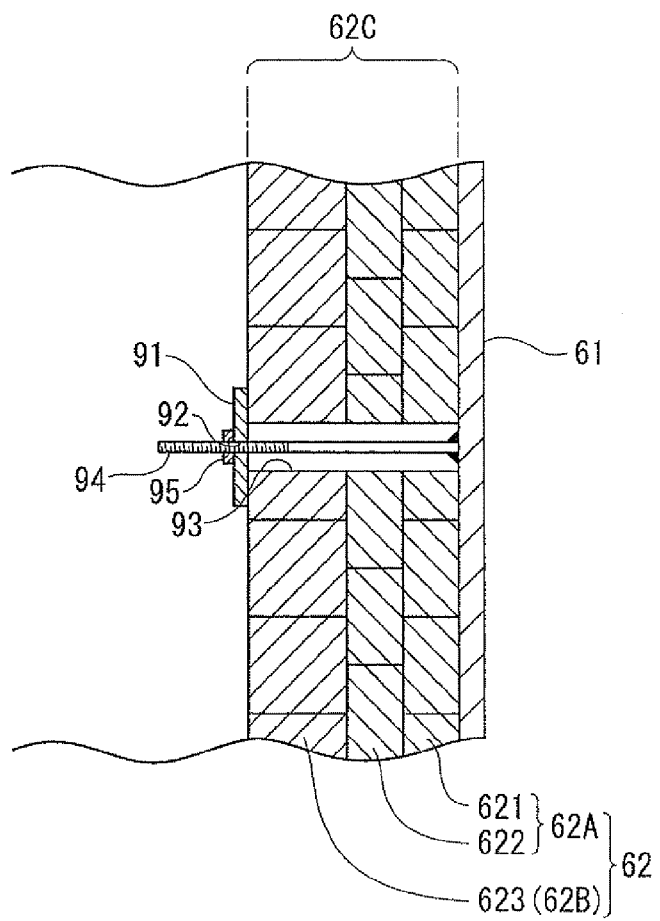
FIG. 9 is an enlarged cross-sectional view showing the remnant fixation according to the first exemplary embodiment.

Referring to FIG. 9, for instance, in the straight body 6, the firebricks 625 and the heat-insulating bricks 624 (see FIG. 5) have been dismantled through the primary dismantling, so that the remnant 62C (i.e., the heat-insulating bricks 623, the heat-insulating board 622 and the slag wool layer 621) is left on the inner side of the furnace shell 61.

The remnant 62C is drilled from the inner side thereof to the inner surface of the furnace shell 61 to form a hole 93. In parallel with the drilling, humectant is injected into the hole 93 for preventing scattering of asbestos substances.

When the hole 93 is opened, one end of the fixation bar 94 is welded onto the inner surface of the furnace shell 61. As the welding, stud welding is preferably employed. The other end of the fixation bar 94 is inserted through the fixation hole 92 and a nut 95 is screwed onto the fixation bar 94 to tighten the fixation bar 94. As a result, the fixation plate 91 is fixed on the furnace shell 61 via the fixation bar 94 and the inner surface of the remnant 62C is pressed by the fixation plate 91, thereby preventing the remnant 62C from falling off.

For the remnant fixation, a vertical interval between the fixation plates 91 may be appropriately selected in accordance with the strength or the like of the remnant to be held. Specifically, when the remnant is thin and a sufficient strength cannot be expected, a close interval may be selected; when the remnant is thick or is provided mainly by a heatproof board having a relatively high strength, a rough interval may be selected.

When the remnant is likely to have a sufficient strength, the remnant fixation may be omitted.

Referring back to FIG. 7, when the primary dismantling in the first section (step S13 in FIG. 6) is completed, only the remnant 52C (see FIG. 5) is left in the portion of the furnace wall above the partition line 3A.

A middle deck 30 is built at the position of the partition line 3A (step S14 in FIG. 6).

Figure 10:
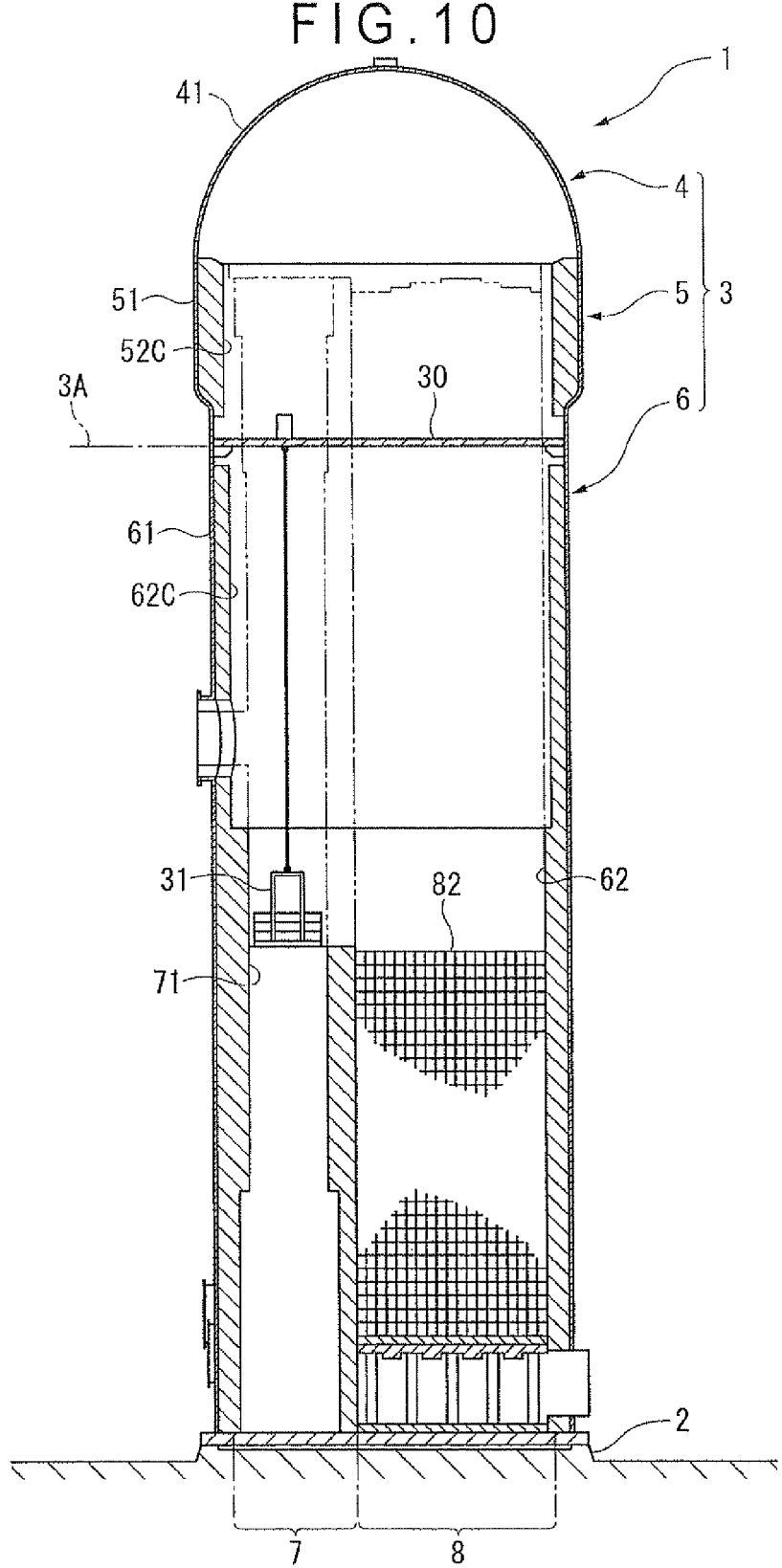
FIG. 10 is a vertical cross-sectional view showing primary dismantling in a second section according to the first exemplary embodiment.

Referring to FIG. 10, the middle deck 30 is formed in a disc by assembling steel frames. An iron plate is laid on the surface of the middle deck 30 so that the middle deck 30 is used as a work floor.

The periphery of the middle deck 30 is fixed on the inner side of the furnace shell 61 of the straight body 6. The remnant 62C has to be penetrated in order to fix the periphery of the middle deck 30. For penetrating the remnant 62C, local asbestos measures using humectant are implemented in the same manner as for the above-described fixation of the fixation plate 91.

After the middle deck 30 is built (step S14 in FIG. 6), secondary dismantling is started in the first section above the middle deck 30 (step S15 in FIG. 6) and, simultaneously, primary dismantling is started in the second section below the middle deck 30 (step S21 in FIG. 6).

In the secondary dismantling, according to the invention, the remnant is dismantled under asbestos measures. Specifically, the secondary dismantling is conducted as follows.

Since the remnant (i.e., the remnants 52C and 62C) is dismantled in the secondary dismantling, asbestos measures are implemented throughout the process of the secondary dismantling.

Figure 11:
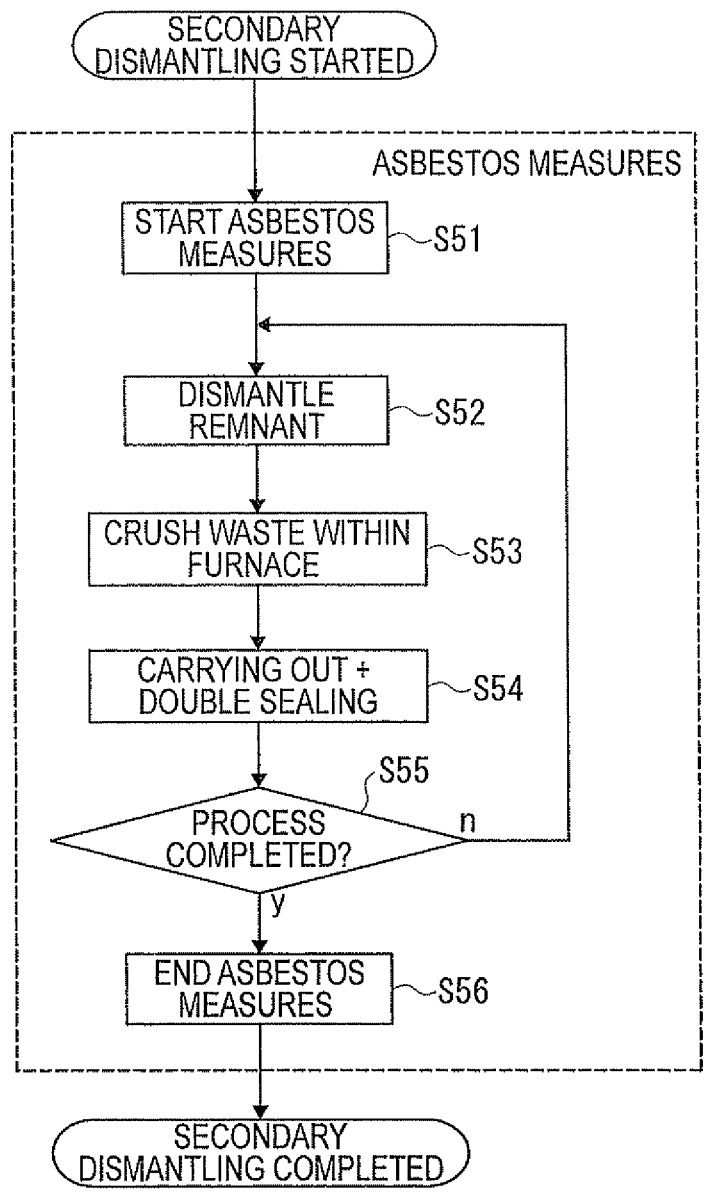
FIG. 11 shows secondary dismantling according to the first exemplary embodiment.

Referring to FIG. 11, asbestos measures are initially started in the secondary dismantling (step S51). Specifically, conditions such as sealing the section and depressurizing the inside thereof are ensured, a sealable container for waste disposal is brought in, and contamination control equipment is provided in a transportation route.

When such preparation is done, the remnant is sequentially dismantled (step S52). The dismantled remnant is crushed within the section in the furnace (step S53). After being put in the sealable container, the crushed remnant is carried out and is subjected to double sealing (step S54).

When the processes in steps S52 to S54 are done for the entire remnant in the section (step S55), the asbestos measures for this section are ended (step S56) and thus the secondary dismantling in this section is completed.

The asbestos measures are appropriately provided to fulfill conditions complying with, for instance, law and ordinance as well as a local government rule depending on where and when the measures are to be implemented.

It is not essential to crush the dismantled remnant inside the furnace, but the dismantled remnant may be crushed after being carried out of the furnace.

In parallel with the secondary dismantling in the first section (step S15 in FIG. 6), the primary dismantling in the second section is conducted (step S21 in FIG. 6).

The primary dismantling in the second section is conducted in the same manner as that in the first section described above.

For the primary dismantling in the second section, a work platform 31 is hung on the middle deck 30. The platform 31 is vertically moved in the gas passage 72 of the combustion chamber 7 so as to ensure, for instance, transportation of workers and resupply of materials to the top of refractories (i.e., the partition 71 and the heat-storage bricks 81) having fallen down during the dismantling.

By repeating the dismantling of the refractories inside the furnace and the dismantling of the furnace wall in each portion as described above, the primary dismantling in the second section (step S21 in FIG. 6) is conducted.

In the first section, after the secondary dismantling (step S15) is completed, new refractories are installed on the inner side of the furnace shell from which the remnant has been removed, thereby restoring the furnace wall (step S16 in FIG. 6). Accordingly, the scaffold is erected in the first section as needed.

In the second section, after the primary dismantling (step S21), secondary dismantling (step S22) and refractory installation (step S23) are conducted.

The secondary dismantling (step S22) and the refractory installation (step S23) in the second section are conducted basically in the same manner as in the first section. Since the second section has a vertically long portion of the straight body 6, the work platform hung on the middle deck 30 is used.

Figure 12:
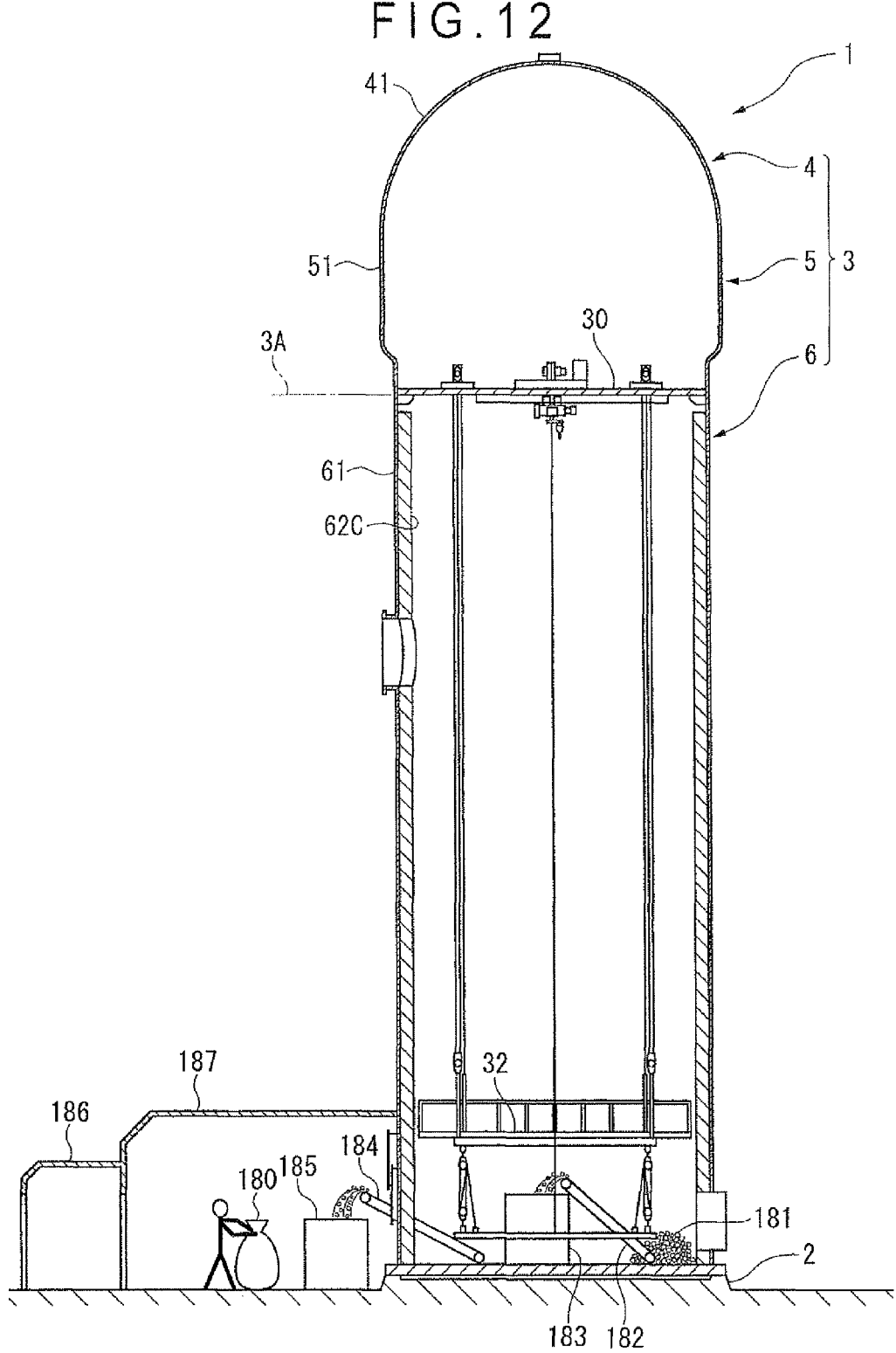
FIG. 12 is a vertical cross-sectional view showing secondary dismantling in the second section according to the first exemplary embodiment.

Referring to FIG. 12, the middle deck 30 is provided with a winch, on which the platform 32 is hung via a wire.

The platform 32 is formed in a disc by assembling steel frames. An iron plate is laid on the surface of the platform 32 so that the platform 32 is used as a work floor. The outer circumference of the platform 32 is spaced from the remnant 62C at a predetermined distance so as not to interfere with the remnant 62C during the vertical movement thereof.

By dismantling the remnant 62C from top to bottom with such a work platform 32, the secondary dismantling in the second section (step S22 in FIG. 6) is conducted.

Through the secondary dismantling, debris 181 generated by dismantling the remnant is piled up on the bottom of the furnace body 3. The debris 181 is crushed to be smaller by using a conveyor 182 and a crusher 183 installed at the bottom of the furnace body 3. The debris 181 is then packed in a special bag 180 and carried out of the furnace. An air-tight compartment 187 provided with a conveyor 184 and a crusher 185 may be provided outside the furnace body 3 so that the debris 181 is crushed by using the conveyor 184 and the crusher 185 or by using the conveyor 182 and the crusher 183 inside the furnace in combination with the conveyor 184 and the crusher 185 outside the furnace. In either case, a security zone 186 is provided for access to and from the outside, thereby preventing asbestos substances from flowing out.

When the secondary dismantling is completed, the refractory installation (step S23 in FIG. 6) for the inner side of the furnace shell 61 is likewise conducted by using the platform 32.

After completion of the refractory installation in the first section (step S16 in FIG. 6) and the refractory installation in the second section (step S23 in FIG. 6), the middle deck 30 is removed (step S17 in FIG. 6). Thus, the refractories of the furnace body 3 are renewed.

In this exemplary embodiment, due to the application of the invention, the asbestos-free refractories can be dismantled without asbestos treatment. Thus, as compared with the dismantled amount based on a typical dismantling process in which asbestos-containing refractories and asbestos-free refractories are dismantled all together (e.g., approximately 7000 $m^3$), the amount of the refractories requiring asbestos treatment (i.e., asbestos-containing refractories and a part of asbestos-free refractories) can be reduced to one seventh (approximately 1000 $m^3$), which results in a significant reduction in the asbestos disposal amount.

According to this exemplary embodiment, since the middle deck 30 is built in the furnace, it is possible to conduct the respective dismantling operations in the upper and lower spaces of the middle deck 30 in parallel with each other. Due to such overlapping in operation time, the total dismantling time has been reduced by approximately one month.

Further, the debris of the asbestos-containing refractories is crushed within the furnace, thereby reducing the disposal amount of asbestos. As compared with an amount of approximately 1000 $m^3$ resulting from conducting the process outside the furnace, the amount has been reduced to approximately 700 $m^3$.

The scope of the invention is not limited to the above exemplary embodiment, but specific arrangement and the like may be altered as needed upon implementation.

Although the two sections such as the first section and the second section are defined inside the furnace body 3 in the first exemplary embodiment, three or more sections may be defined. Respective middle decks may be built between the sections so as to implement asbestos measures for each section.

Second Exemplary Embodiment

Figure 13:
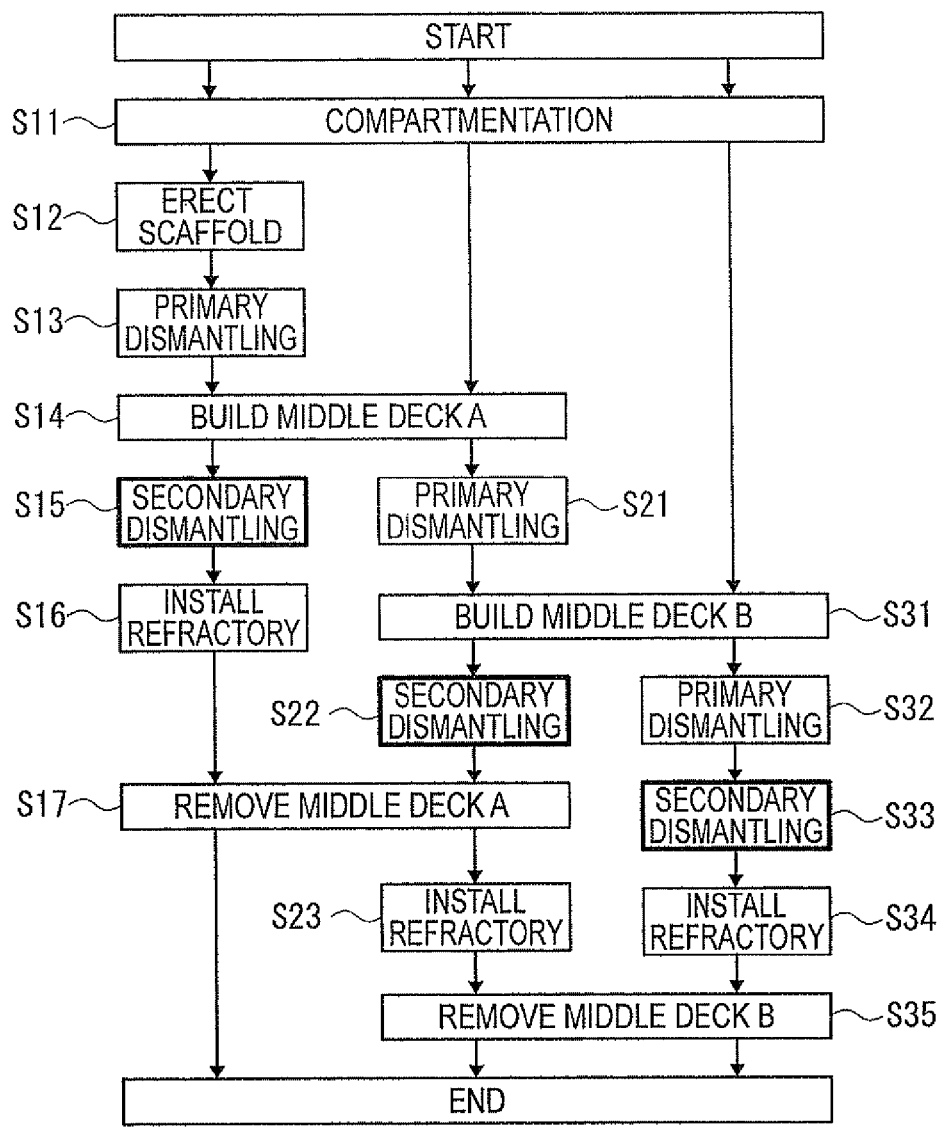
FIG. 13 shows a dismantling process according to a second exemplary embodiment of the invention.

In a second exemplary embodiment shown in FIG. 13, first to third sections are defined and respective middle decks A and B are built therebetween so as to sequentially conduct the primary dismantling and the secondary dismantling in each section.

As to the first section, the processes in steps S11 to S17 are the same as those in FIG. 6. It should be noted that steps S14 and S17 are related to the middle deck A.

As to the second section, the processes in steps S21 to S23 are the same as those in FIG. 6. It should be noted that steps S14 and S17 are related to the middle deck A, and steps S31 and S35 related to the middle deck B are added.

As to the third section, the steps S31 to S35 are added as compared with those in FIG. 6. These added steps correspond to the steps S14, S21 to S23 and S17 related to the second section in FIG. 6, respectively.

This exemplary embodiment can achieve the same advantages as those according to the first exemplary embodiment. In addition, the increased sections result in an increased ratio of concurrent processes.

According to this exemplary embodiment, the secondary dismantling, in which complicated processes are concentrated, can be likewise conducted in the individual sections at sequentially shifted timings, so that the processes can be conducted effectively in terms of equipment sharing or the like.

Although the descriptions made in the above exemplary embodiments are related to an internal-combustion hot-blast furnace, the same process is also applicable to an external-combustion hot-blast furnace.

Third Exemplary Embodiment

Figure 14:
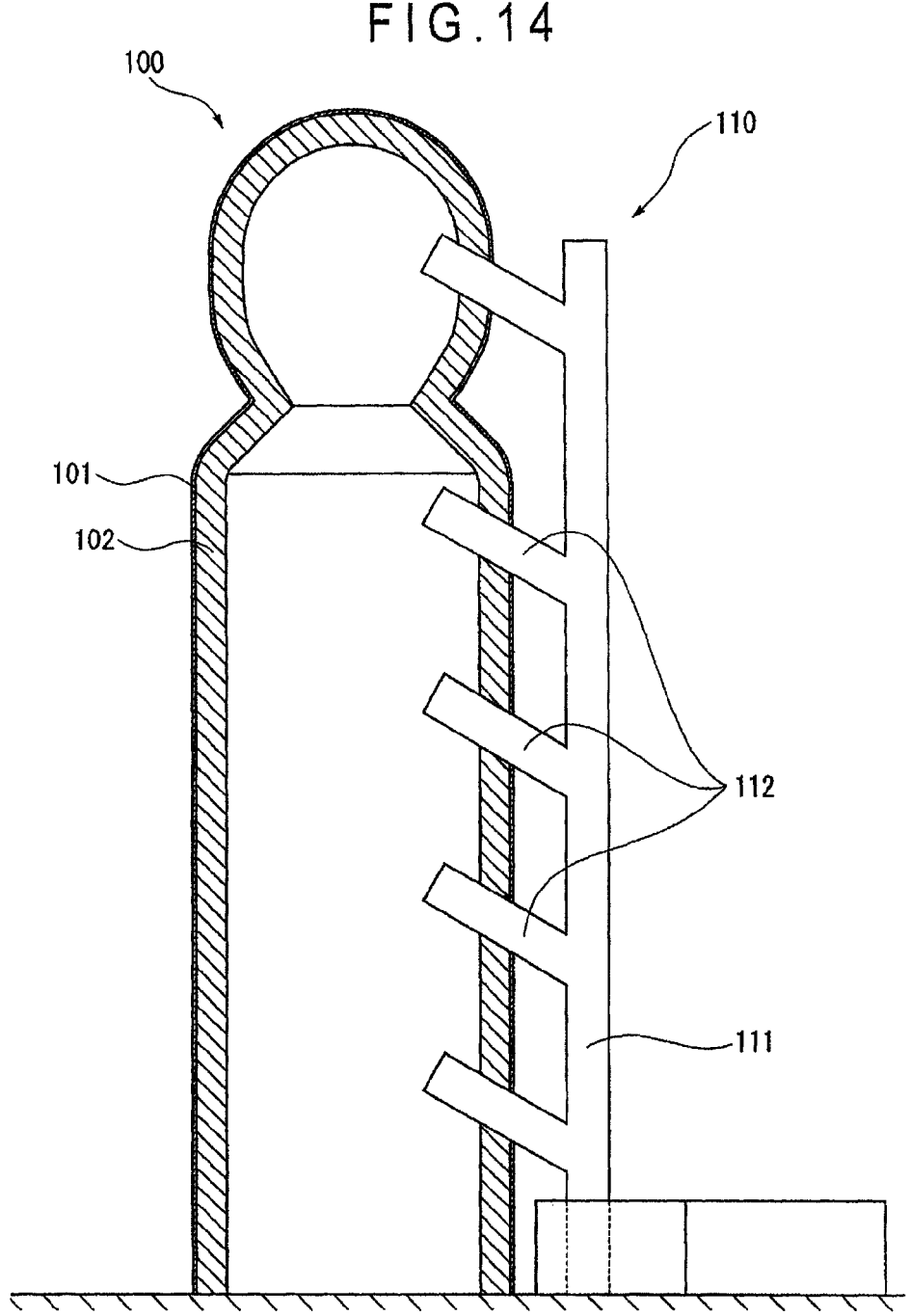
FIG. 14 is a vertical cross-sectional view showing a hot-blast furnace according to a third exemplary embodiment of the invention.

In a third exemplary embodiment shown in FIG. 14, a heat-storage furnace or combustion furnace 100 is entirely used as a regenerator or a combustion chamber. The furnace body of the heat-storage furnace or combustion furnace 100 includes a furnace shell 101 and a multilayered refractory structure 102 provided by piled asbestos-containing and asbestos-free firebricks. The invention is applicable to such an external-combustion heat-storage furnace or combustion furnace 100, thereby achieving the same advantages as those according to the first and second exemplary embodiments.

According to the third exemplary embodiment, for carrying dismantled refractories, a chute 110 dedicated for unloading is provided outside the heat-storage furnace or combustion furnace 100. The chute 110 includes a straight body 111 that vertically extends along the heat-storage furnace or combustion furnace 100 and a plurality of branch pipes 112 branched from the straight body 111. The branch pipes 112 penetrate through the furnace wall of the heat-storage furnace or combustion furnace 100 to communicate with the inside of the furnace, so that refractories can be dumped out of the furnace. The lower end of the chute 110 is opened, so that general refractories are allowed to freely fall to be collected and discharged.

In using such a dedicated chute 110, the straight body 111 may be provided interconnecting a plurality of furnaces so that the plurality of furnaces share the same straight body 111 or the like. Sharing the straight body 111 or the like contributes to a further reduction in cost and time.

Although the descriptions made in the above exemplary embodiments are related to a hot-blast furnace for supplying hot blast to a blast furnace, the invention is also applicable to furnaces having a multilayered refractory structure for other uses, such as a blast furnace for a non-ferrous furnace, a glass furnace, an annealing furnace of continuous processing equipment for a thin plate, and a heating furnace for various steel materials, thereby achieving the same advantages as those according to the above exemplary embodiments.

Fourth Exemplary Embodiment

Figure 15:
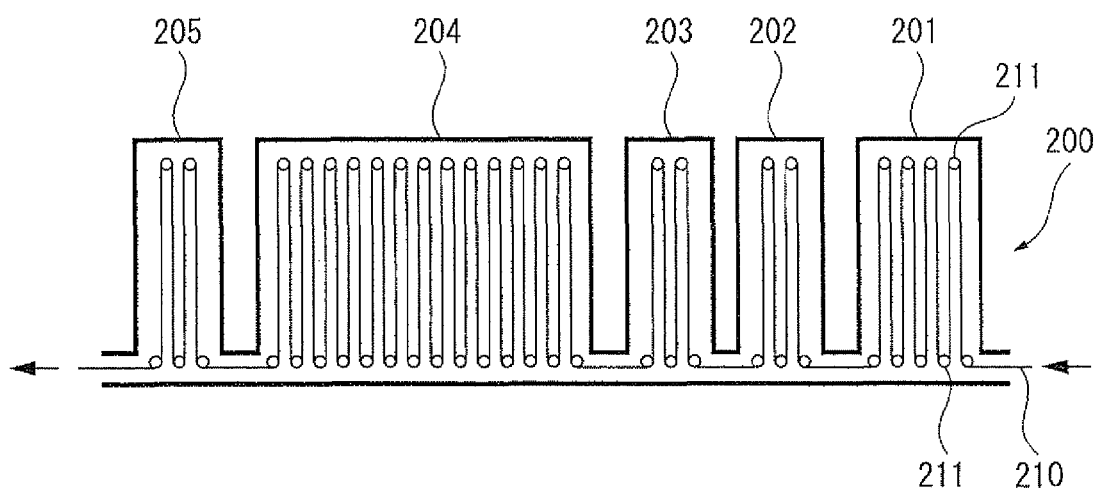
FIG. 15 schematically shows a continuous annealing and pickling line for a cold-rolled steel sheet according to a fourth exemplary embodiment of the invention.

FIG. 15 shows a continuous annealing and pickling line for cold-rolled steel sheet 200 This line is equipped with a heating area 201, a soaking area 202, a primary cooling area 203, an overaging area 204 and a secondary cooling area 205, which are sequentially arranged from a side on which a cold-rolled steel sheet 210 is introduced (i.e., right side in the figure). Transfer rollers 211 are provided to each portion so that the cold-rolled steel sheet 210 is fed in a zig-zag manner. Each portion is provided with a heater (not shown) so that the temperature of the cold-rolled steel sheet 210 passing therethrough is raised to or kept at a predetermined level.

Figure 16:
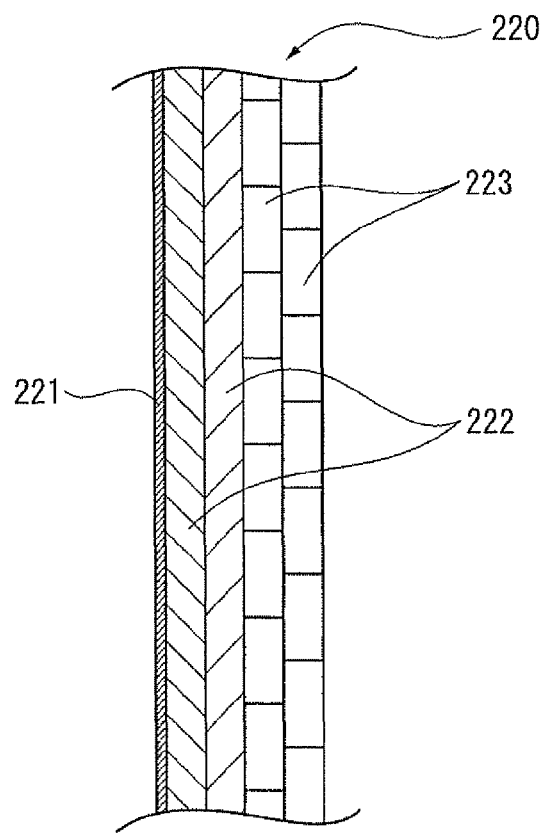
FIG. 16 is an enlarged cross-sectional view showing a furnace body according to the fourth exemplary embodiment.

FIG. 16 shows a structure of a furnace body 220 of the heating area 201 or the soaking area 202. Since the cold-rolled steel sheet 210 is exposed to high heat in the furnace at the heating area 201 and the soaking area 202, the furnace body 220 is provided with a multilayered refractory structure containing asbestos. Specifically, two layers of heat-insulating boards 222 that contain asbestos as a refractory are laid on the inner side of a furnace shell 221 and two layers of asbestos-free firebricks 223 are laid on the heat-insulating boards 222. The invention is applicable when the heating area 201 and the soaking area 202 each having the furnace body 220 are dismantled as furnaces, thereby achieving the same advantages as those according to the above exemplary embodiments.

Although the elongated fixation plate 91 is used to prevent the remnant of the asbestos-containing refractories from falling off according to the above exemplary embodiments, a different technique may be employed to fix the fixation plate 91 in place of using the fixation bar 94 that penetrates through the refractories.

Fifth Exemplary Embodiment

FIGS. 17 to 20 show a fifth exemplary embodiment of the invention. According to the fifth exemplary embodiment, a plurality of fixation plates 191, which form circles, are used in the straight body 6 of the hot-blast furnace 1 similar to that according to the first exemplary embodiment so as to fix the remnant 62C of the asbestos-containing refractories on the furnace shell 61. The fixation plates 191 are supported together by a plurality of longitudinal members 192.

Figure 17:
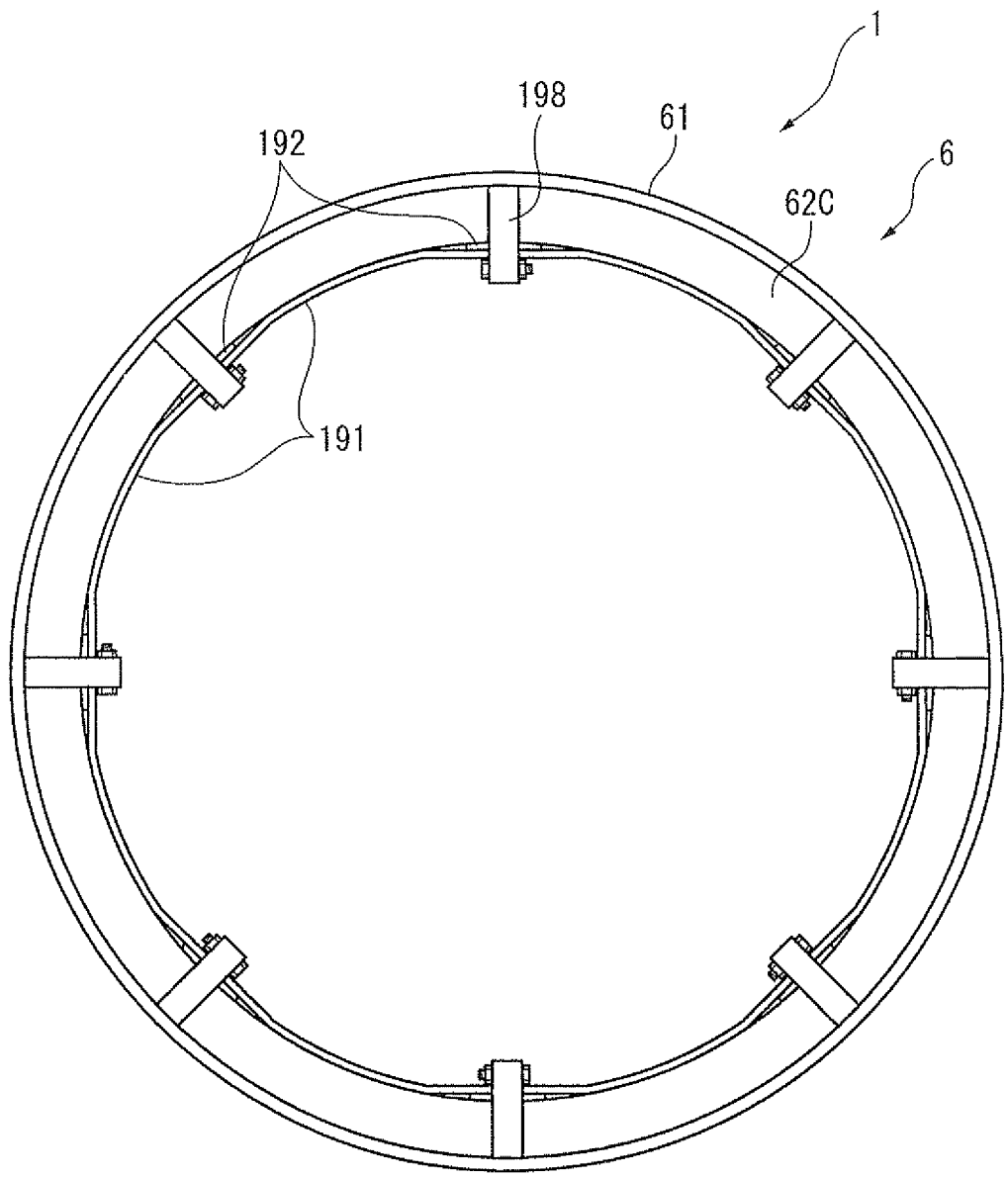
FIG. 17 is a traverse cross-sectional view showing a hot-blast furnace according to a fifth exemplary embodiment of the invention.
Figure 18:
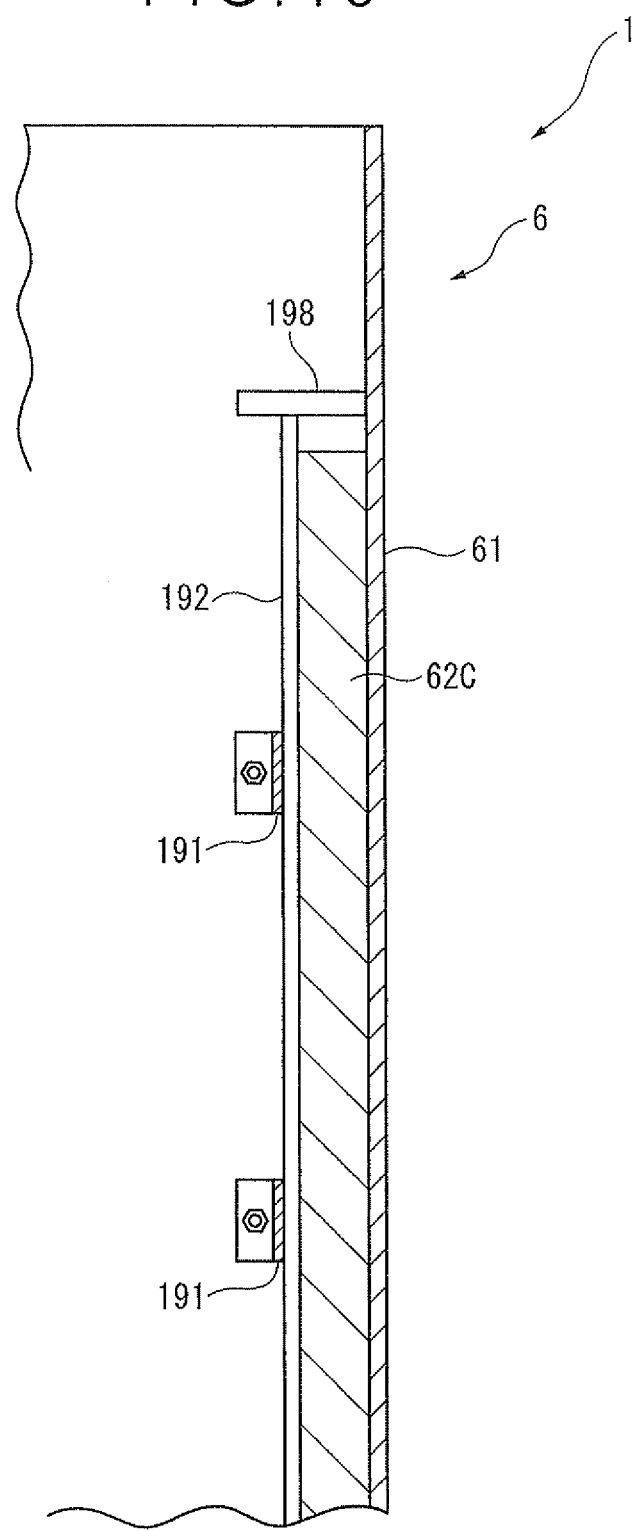
FIG. 18 is a vertical cross-sectional view showing the hot-blast furnace according to the fifth exemplary embodiment.

As shown in FIGS. 17 and 18, the remnant 62C is left on the inner side of the furnace shell 61 and the longitudinal members 192 are provided along the inner side of the remnant 62C. The longitudinal members 192, each of which is an elongated plate material that extends in a continuing direction of the straight body 6 (i.e., vertical direction), are arranged in a circumferential direction of the straight body 6 at predetermined intervals. The plurality of fixation plates 191 are provided in such a manner as to sequentially couple the longitudinal member 192 to one another.

Each of the fixation plates 191 is provided by curving an elongated plate material in an arc. By coupling the plurality of arc-shaped fixation plates 191 to one another, the fixation plates 191 in combination form a circle along a circumferential direction of the inside of the furnace. A plurality of such circles of the fixation plates 191 are arranged along the continuing direction of the straight body 6, i.e., the vertical direction, at predetermined intervals. Thus, the plurality of circles of the fixation plates 191 are coupled to one another via the plurality of longitudinal members 192 circumferentially arranged, thereby providing a basket-like structure.

Figure 19:
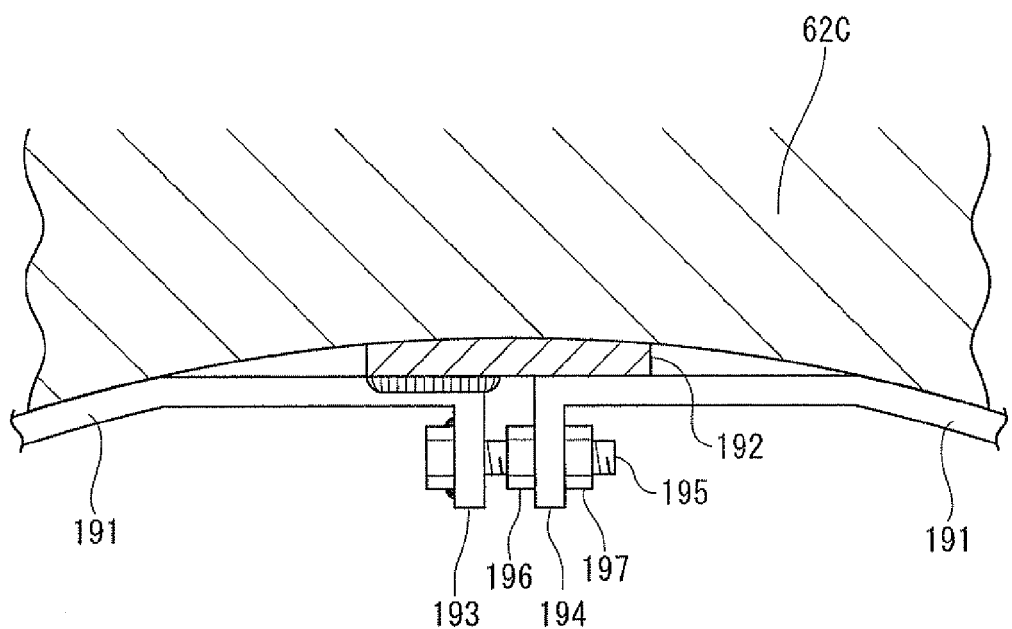
FIG. 19 is an enlarged traverse cross-sectional view showing a primary portion of the fifth exemplary embodiment.
Figure 20:
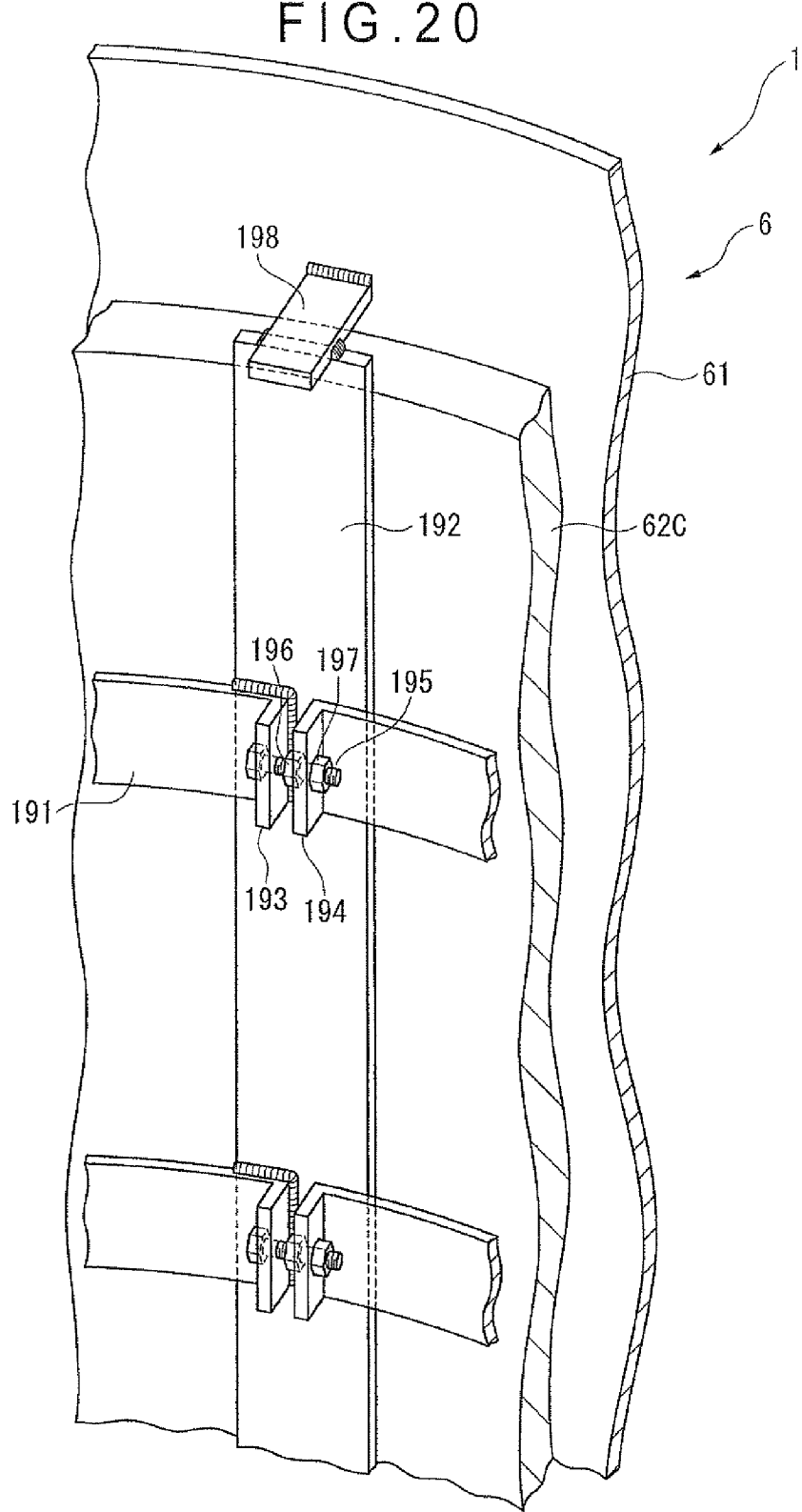
FIG. 20 is a perspective view showing the primary portion of the fifth exemplary embodiment.

FIGS. 19 and 20 show a connecting portion between the fixation plate 191 and the longitudinal member 192.

Both ends of the fixation plate 191 are bent to provide flanges 193 and 194. The flange 193 is fixed to the longitudinal member 192 by welding or the like. The flange 194 is set along the longitudinal member 192 and faces the flange 193 of the opposite fixation plate 191. The flange 194 of the fixation plate 191 is not fixed on the longitudinal member 192. The fixation plate 191 is fixed on the longitudinal member 192 only at the flange 193. In other words, one fixation plate 191 is fixed only on one longitudinal member 192 and thus one longitudinal member 192 has the fixation plates 191 at a plurality of intermediate positions thereof to provide a comb-like structure. Such a comb-like structure is sequentially coupled to another one to provide a basket-like structure having a desired perimeter.

The opposite flanges 193 and 194 are coupled together with a bolt. A bolt 195 penetrates through the flange 193 and the bolt head is fixed to the flange 193 by welding or the like. The shaft of the bolt 195 is inserted through an insertion hole in the flange 194 and is fixed to the flange 194 with a positioning nut 196 and a tightening nut 197. By appropriately selecting the position of the positioning nut 196 relative to the bolt 195, an interval between the flanges 193 and 194 can be adjusted for adjusting the perimeter of the circle formed by the fixation plates 191 in accordance with the inner side of the remnant 62C. Through such adjustment, the fixation plates 191 are pressed against the remnant 62C over a majority of the intermediate portion thereof, except for the ends thereof connected to the longitudinal members 192, thereby preventing the remnant 62C from falling off.

Support members 198 are fixed to the upper and lower ends of the longitudinal members 192 by welding or the like and are also fixed to the inner side of the furnace shell 61 at portions where the remnant 62C does not exist by welding or the like. Since these support members 198 support all of the longitudinal members 192 and the fixation plates 191 on the furnace shell 61, this exemplary embodiment does not require a portion or the like intended to penetrate through the asbestos-containing remnant 62C.

Thus, according to this exemplary embodiment, the remnant 62C inside the furnace can be held without penetrating the remnant 62C with a fixation bar or the like, which results in less possibility of scattering of the asbestos-containing refractories and thus in simplification of an operation for preventing scattering.

As the fixation plate 191, a sheet-like or wide plate material may be used in place of the elongated plate material, thereby changing the basket-like structure based on the longitudinal members 192 to a planarly continuous cylindrical structure, in which the fixation plate 191 serves to cover the asbestos-containing remnant as well as hold the remnant.

The invention claimed is:

1. A method for dismantling a furnace having a multilayered refractory structure comprising:
   an outer shell;

a containing layer that is formed of a containing refractory that contains asbestos and covers an inner side of the outer shell; and a multilayered non-containing layer that is formed of a non-containing refractory that contains no asbestos and covers an inner side of the containing layer, the method comprising:

primary dismantling, wherein in the primary dismantling,
the primary dismantling is performed without asbestos measures being implemented, and
the non-containing layer is dismantled from a furnace core side thereof but at least one outermost layer of layers that form the non-containing layer as well as the containing layer are left as a remnant; and secondary dismantling conducted after the primary dismantling, wherein in the secondary dismantling,
the remnant is dismantled while asbestos measures are implemented.

2. The method according to claim 1, wherein
in the primary dismantling, the remnant is fixed on the outer shell.

3. The method according to claim 1, wherein
an inside of the furnace is vertically divided into a plurality of sections, each of which being sequentially subjected to the primary dismantling and the secondary dismantling, and
the sections are independently subjected to the primary dismantling and the secondary dismantling at sequentially shifted timings.

4. The method according to claim 1, wherein
in the secondary dismantling, debris generated after dismantling the remnant is further crushed within the furnace.

* * * * *